(12) United States Patent
Horng et al.

(10) Patent No.: US 6,522,507 B1
(45) Date of Patent: Feb. 18, 2003

(54) SINGLE TOP SPIN VALVE HEADS FOR ULTRA-HIGH RECORDING DENSITY

(75) Inventors: Cheng T. Horng, San Jose, CA (US); Min Li, Fremont, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/570,017

(22) Filed: May 12, 2000

(51) Int. Cl.[7] .............................. G11B 5/39; C21D 1/04
(52) U.S. Cl. .................... 360/324.12; 29/603.14; 148/108
(58) Field of Search ................ 360/324.1, 324.11, 360/324.12, 324.2; 29/603.07, 603.08, 603.09, 603.13, 603.14; 148/108, 121

(56) References Cited

U.S. PATENT DOCUMENTS

| | | | |
|---|---|---|---|
| 5,583,725 A | * 12/1996 | Coffey et al. | 324/252 |
| 5,701,223 A | 12/1997 | Fontana, Jr. et al. | 360/324.11 |
| 5,852,531 A | 12/1998 | Yamada | 360/324.1 |
| 5,896,252 A | 4/1999 | Kanai | 360/324.12 |
| 5,920,446 A | 7/1999 | Gill | 360/324 |
| 6,090,480 A | * 7/2000 | Hayashi | 324/252 |
| 6,114,850 A | * 9/2000 | Hayashi | 324/207.21 |
| 6,141,191 A | * 10/2000 | Lee et al. | 360/324.1 |
| 6,208,492 B1 | * 3/2001 | Pinarbasi | 360/324.11 |
| 6,262,869 B1 | * 7/2001 | Lin et al. | 360/324.11 |
| 6,270,588 B1 | * 8/2001 | Takano et al. | 148/108 |
| 6,302,970 B1 | * 10/2001 | Shimazawa et al. | 148/108 |
| 6,322,640 B1 | * 11/2001 | Xiao et al. | 148/308 |
| 6,178,071 B1 | * 1/2002 | Hasegawa et al. | 360/324.11 |

FOREIGN PATENT DOCUMENTS

JP 10-223942 * 8/1998

* cited by examiner

*Primary Examiner*—David L. Ometz
(74) *Attorney, Agent, or Firm*—George O. Saile; Stephen B. Ackerman

(57) ABSTRACT

A method for fabricating a single top spin valve head that is capable of reading ultra-high density recordings. Said top spin valve has a CoFe free layer for high GMR ratio, which is grown on a NiCr/Ru layer to provide better magnetic properties and has a ferromagnetically coupled CoFe/NiCr/CoFe laminated pinned layer for thermal stability and robustness.

28 Claims, 3 Drawing Sheets

SINGLE TOP SPIN VALVE HEADS FOR ULTRA-HIGH RECORDING DENSITY

RELATED PATENT APPLICATION

This application is related to Ser. No. 09/495,348, filing date Feb. 1, 2000, assigned to the same assignee as the current invention.

BACKGROUND OF THE INVENTION

1. Field of the Invention

This invention relates generally to the fabrication of a giant magnetoresistive (GMR) magnetic field sensor in a magnetic read head, more specifically to a spin valve type of GMR sensor of the top spin valve type.

2. Description of the Related Art

Early forms of magnetic read heads decoded magnetically stored data on media such as disks and tapes by making use of the anisotropic magnetoresistive effect (AMR) in magnetic materials such as permalloy. This effect is the change in the electrical resistance, r, of certain magnetic materials in proportion to the angle between the direction of their magnetization and the direction of the current through them. Since changing magnetic fields of moving magnetized media, such as magnetically encoded tapes and disks, will change the direction of the magnetization in a read head, the resistance variations of the AMR effect allows the information on such encoded media to be sensed and interpreted by appropriate circuitry.

One shortcoming of the AMR effect was the fact that it produced a maximum fractional resistance change, $Dr/r$ (where $Dr$ is the change in resistance between the magnetic material subjected to its anisotropy field, $H_k$, and the material subjected to zero field), which was only on the order of a few percent. This made the sensing process difficult to achieve with accuracy.

In the late 1980's and early 1990's the phenomenon of giant magnetoresistance (GMR) was discovered and soon applied to read head technology. The GMR effect derives from the fact that thin (20–80 angstroms) layers of ferromagnetic materials, when separated by even thinner (20–30 angstroms) layers of electrically conductive but non-magnetic materials, will acquire ferromagnetic (parallel spin direction of the layers) or antiferromagnetic states (antiparallel spin direction of the layers) by means of exchange interactions between the spins. As a result of spin dependent electron scattering as electrons crossed the layers, the magnetoresistance of such layered structures was found to be significantly higher in the antiferromagnetic state than the ferromagnetic state and the fractional change in resistance was much higher than that found in the AMR of individual magnetic layers.

Shortly thereafter a version of the GMR effect called spin valve magnetoresistance (SVMR) was discovered and implemented. In the SVMR version of GMR, two ferromagnetic layers such as CoFe or NiFe are separated by a thin layer of electrically conducting but non-magnetic material such as Cu. One of the layers has its magnetization direction fixed in space or "pinned," by exchange anisotropy from an antiferromagnetic layer directly deposited upon it. The remaining ferromagnetic layer, the unpinned or free layer, can respond to small variations in external magnetic fields such as are produced by moving magnetic media, (which do not affect the magnetization direction of the pinned layer), by rotating its magnetization direction. This rotation of one magnetization relative to the other then produces changes in the magnetoresistance of the three layer structure.

The spin valve structure has now become the implementation of choice in the fabrication of magnetic read head assemblies. The trend in recent patents has been to improve the sensitivity and stability of these spin valves by novel choices of the materials used to form their various ferromagnetic and antiferromagnetic pinned and pinning layers and by variations in the number, positioning and dimensions of such layers. In this connection, Kanai (U.S. Pat. No. 5,896,252) teaches a method for constructing a spin valve magnetoresistive (SVMR) head element in which the free (unpinned) magnetic layer is manufactured in a two-layer structure composed of a CoFe layer and an NiFe layer. Fontana, Jr. et al. (U.S. Pat. No. 5,701,223) teach a method for forming a spin valve magnetoresistive sensor using a laminated pinned layer that is placed in a magnetically exchange-coupled antiparallel configuration and combined with an antiferromagnetic exchange biasing layer. The pinned layer comprises two ferromagnetic films that are separated by a non-magnetic exchange coupling film.

Yamada (U.S. Pat. No. 5,852,531) teaches a method of constructing a spin valve magnetoresistive head that reduces the asymmetry in head response caused by a competition between the giant magnetoresistive effect (GMR), which is due to changes in magnetization direction between the pinned and unpinned layer and the anisotropic magnetoresistive effect (AMR), which is due to variations in angle between the current and the magnetization direction of the single unpinned layer. Finally, Gill (U.S. Pat. No. 5,920,446) teaches a method of forming a GMR sensor for ultra-high density recordings by using two free layers rather than a free layer, a pinned layer and a pinning layer. This formation reduces the overall thickness of the read head, making it more suitable for decoding higher recording densities. The free layers are each laminated, comprising two ferromagnetic layers coupled in an anti-parallel configuration by a spacer layer. The sense current flowing through the formation provides the necessary bias field to set the magnetic field directions of the layers and the variations in magnetization direction in either or both layers produces the requisite resistance variations.

Further improvements in the design and fabrication of SVMR read heads must now be directed towards their use in decoding hard disks whose magnetic information content is approaching an area density greater than 35 gigabytes per square inch (35 $Gb/in^2$). At such extreme densities, the read head requires an increasingly narrow read gap and correspondingly thinner and/or fewer magnetic layers. As the thickness of these layers decreases, however, it becomes increasingly difficult to obtain a controllable bias point, a high GMR ratio ($Dr/r$) and good magnetic softness. As presently fabricated, SVMR sensors, such as those referred to above, are adequate for densities on the order of a few gigabytes per square inch, but they lack the requisite physical properties to accurately decode the increased density. It is the aim of the present invention to also address the problem of fabricating an SVMR read head that is capable of decoding ultra-high densities of magnetically encoded information.

SUMMARY OF THE INVENTION

A first object of this invention is to provide a method for forming a magnetoresistive (MR) sensor element whose operation is based upon the giant magnetoresitive properties of certain magnetic structures, along with the magnetoresistive (MR) sensor element whose operation is so based.

A second object of this invention is to provide a method for forming a magnetoresistive (MR) sensor element which is capable of and suitable for decoding ultra-high density (35 Gb/in$^2$ and above) magnetic recordings, along with the magnetoresistive (MR) sensor element having said capability and suitability.

A third object of this invention is to provide a robust spin valve magnetoresistive (SVMR) sensor with a controllable bias point, excellent thermal stability and high output performance.

In accord with the objects of this invention there is provided a spin valve magnetoresistive (SVMR) sensor and a method for its fabrication. Said spin valve magnetoresistive sensor is of the single top spin valve structure, which provides advantages in the reading of ultra-high density magnetic data because it comprises fewer layers and is correspondingly thinner than other structural forms. In addition to the improved read capabilities associated with the thinness of the single top spin valve structure, the inherent simplicity of the form leads to a simpler, more efficient and more economical manufacturing process.

Further in accord with the objects of this invention, there is provided a single top spin valve magnetoresistive sensor element ("top" referring to the position of the pinned layer) for which a typical optimal configuration (as formed between an upper and lower substrate) is empirically determined to be:

$X_1$ NiCr/$X_2$ Ru/$X_3$ CoFe/$X_4$ Cu/$X_5$ CoFe/$X_6$ NiCr/$X_7$ CoFe/X MnPt/$X_9$ NiCr where the symbols, $X_n$, represent thicknesses of the various materials given in a range of angstroms according to Table 1, below:

TABLE 1

| Material Thickness | Range in Angstroms |
| --- | --- |
| $X_1$ | 40–70 |
| $X_2$ | 3–25 |
| $X_3$ | 10–60 |
| $X_4$ | 18–30 |
| $X_5$ | 8–20 |
| $X_6$ | 2–5 |
| $X_7$ | 4–10 |
| $X_8$ | 100–300 |
| $X_9$ | 20–50 |

Further in accord with the objects of this invention and as can be seen from the configuration depicted above the table (in which the "top" of the configuration is to the right), said top spin valve structure of the present invention is fabricated so as to employ and embody the advantages resulting from the specular reflection of conduction electrons from certain material layers of the spin valve structure, specifically from the Ru/CoFe layer combination whose thicknesses fall within the ranges specified above. Such specular reflection, when acting in concert with the spin dependent scattering of the GMR effect, produces further enhancements of the magnetoresistance ratio, Dr/r, thus making the structure able to sense the weaker magnetic signals produced by higher density recordings. Still further in accord with the objects of this invention, said CoFe layer (the free layer) grown on a Ru layer is characterized by superior thermal stability and produces extremely favorable magnetic properties, specifically improved magnetic softness and uniaxiality, resulting in higher signal sensitivity.

Yet further in accord with the objects of this invention, there is provided a laminated pinned layer structure of the form CoFe/NiCr/CoFe to insure robustness in the sense that the magnetic orientation of the pinned layer will remain essentially constant after it is oriented by annealing. Finally, in accord with the objects of said invention there is incorporated an MnPt pinning layer deposited on a ferromagnetic layer. Under such circumstances, MnPt is characterized by a high blocking temperature, high exchange bias field ($H_{ex}$) and superior corrosion resistance.

DESCRIPTION OF THE PREFERRED EMBODIMENTS

Figure 1A:
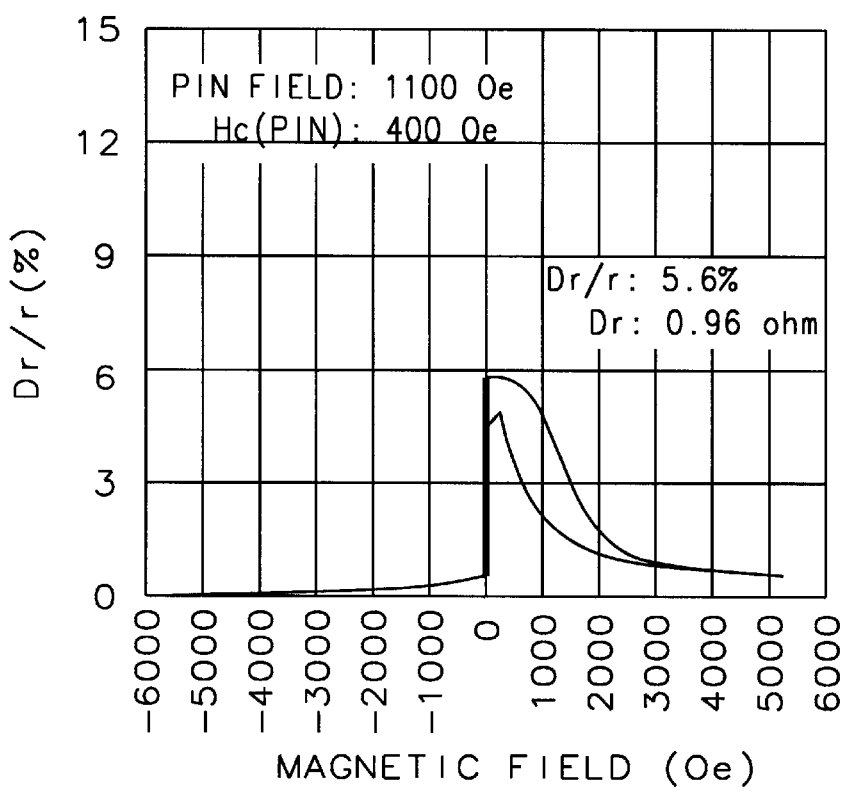
FIG. 1A is a hysteresis graph of external magnetic field strength (in Oe) vs. change in MR ratio (Dr/r), expressed as a percentage (%), for a particular pinned layer structure consisting of: Ta(75 A)/CoFe(20 A)/Cu(30 A)/CoFe(20 A)/MP(200 A)/Ta(50 A). Note, the thicknesses are in angstroms (A) and MP indicates MnPt. This and the following two graphs are used to indicate the robustness of various pinned layer structures.

The preferred embodiment of the present invention, a spin valve magnetoresistive sensor (SVMR) of the single top valve type, will be described following a discussion of a series of experimental investigations (device modelling) whose purpose was to establish an optimal configuration that met the objects of the invention.

Spin valve structures of the form:

$X_1$ NiCr/$X_2$ Ru/$X_3$ CoFe/$X_4$ Cu/$X_5$ CoFe/X6 NiCr/$X_7$ CoFe/$X_8$ MnPt/$X_9$ NiCr had been fabricated, where the symbols, $X_n$, represent thicknesses of the various materials given in a range of angstroms according to Table 2, below.

TABLE 2

| Material Thickness | Range in Angstroms |
| --- | --- |
| $X_1$ | 40–70 |
| $X_2$ | 3–25 |
| $X_3$ | 10–60 |
| $X_4$ | 18–30 |
| $X_5$ | 8–20 |
| $X_6$ | 2–5 |
| $X_7$ | 4–10 |
| $X_8$ | 100–300 |
| $X_9$ | 20–50 |

To characterize free layer anisotropy, free layer stacks consisting of: 55 A NiCr/5 A Ru/20 A CoFe/20 A Cu/50 A NiCr (A indicating angstroms) were prepared and studied. To fix the field of the pinned layer, the stacks were first annealed for approximately 5 hours at a temperature of approximately 280° C. in a transverse orienting of 2,000 Oe.

Magnetic properties of the annealed free layer structures were measured and are listed in Table 3 below, wherein $B_s$ is the free layer magnetic moment in nano-Webers (nWeb), $H_c$ is the free layer coercivity in Oersteds (Oe), $H_k$ is the anisotropy field (Oe), $R_s$ is the sheet resistance of the structure in ohms/□ (square), Dr/r is the magnetoresistive ratio and the final column is the field needed to close the hard axis of the free layer.

NiCr/-based spin valve. The NiCr/Ru/-based spin valve is, therefore, expected to have a higher sensitivity.

Pinned layer robustness of the above configurations was also studied. After annealing of the pinned layer, the orientation of its magnetic moment relative to the MR sensor was studied. The orientation was then re-measured after resetting the easy axis of the free layer by low field annealing (50 Oe at 290° C. for 30 min.). The results are indicated in the last

TABLE 3

| Layer Structure | | $B_s$ (nWeb) | $H_c$ (Oe) | $H_k$ (Oe) | $R_s$ (Ohms/□) | Dr/r (%) | Field to close HA (Oe) |
|---|---|---|---|---|---|---|---|
| Ta75/CoFe20/Cu30/Ta50 | As-dep. | 0.25 | 10.9 | 18.7 | 35.4 | 0.12 | |
| | Annealed | 0.14 | 5.1 | 4.6 | 35.5 | 0.08 | 5 |
| NiCr55/CoFe20/Cu22/NiCr50 | Annealed | 0.26 | 9.6 | 13.9 | 35.4 | 0.33 | 20 |
| NiCr55/Ru5/CoFe20/Cu20/NiCr50 | Annealed | 0.25 | 4.4 | 9.2 | 35.3 | 0.14 | 4 |

In the as-deposited state (first row), the magnetic moment ($B_s$) of the 20 angstrom CoFe free layer formed on the 75 angstrom Ta seed layer is 0.25 (nWeb).

There is interdiffusion between CoFe and Ta during the approximately 5 hour anneal at approximately 280° C. (second row) which reduces the magnetic moment to 0.14 nWeb. CoFe formed on a NiCr seed layer (row 3) shows poor magnetic anisotropy and, in fact, is isotropic. A longitudinal field in excess of 20 Oe is required close the hard-axis (HA) loop. When CoFe is formed on a NiCr/Ru seedlayer (row 4), it exhibits anisotropic behavior with lower $H_c$ (4.4 Oe) and $H_k$ (9.2 Oe). The longitudinal field needed to close the CoFe free layer HA loop is 4 Oe, significantly less than the 20 Oe needed in the NiCr structure.

Table 4 below displays the magnetic performances of various spin valve structures having a 20 A CoFe free layer. In this table $H_e$ is the interlayer coupling field and "pin rotation" refers to the rotation of the magnetic moment of the pinned layer, initially fixed in a field of 2000 Oe, after the magnetic easy axis of the free layer is reset by a low field (eg. 50 Oe) annealing. A small rotation angle is an indication of the robustness of the structure.

column of Table 4. It can be seen that the free layer reset annealing has induced large pinned layer rotations in the Ta/, NiCr/ and NiCr/Ru/ configurations (rows 1,2 & 3). This, in turn, caused a reduction in Dr by approximately 10%. To improve the robustness of the pinned layer, NiCr/Ru/-based spin valves were configured with a laminated pinned layer structure, whose configuration is seen in row 4 of Table 4 and as is taught in the related patent application cited above.

Improvement of pinned layer robustness is most easily illustrated in hysteresis graphs plotting the value of MR (%) (magnetoresistive ratio, Dr/r) vs. an applied magnetic field that sweeps from 6000 Oe in the direction of the pinned layer, to 6000 Oe in the opposite direction, then returns to 6000 Oe in the pinned direction. Three such graphs are illustrated in the accompanying figures, in all of which the label "$H_c$(PIN)" refers to Hc of the pinned layer. FIG. 1A is a graph of external magnetic field strength (in Oe) vs. change in MR ratio (Dr/r), expressed as a percentage (%), for a particular pinned layer structure consisting of: Ta(75 A)/CoFe(20 A)/Cu(30 A)/CoFe(20 A)/MP(200 A)/Ta(50 A). This is the configuration of row 1 of Table 4. It is noted on the graph that this particular configuration corresponds to a pinning field of 1100 Oe, an $H_c$ value of 400 Oe, a Dr/r value

TABLE 4

| Spin Valve Structure | $B_s$ | $H_c$ | $H_e$ | $H_k$ | $R_s$ | Dr/r | Dr | Pin Rotation |
|---|---|---|---|---|---|---|---|---|
| 1. Ta55/ CoFe20/Cu30/CoFe20/MP200/Ta50 | 0.16 | 6.4 | 27.4 | 13.8 | 17.2 | 5.6 | 0.96 | 7.5° |
| 2. NiCr55/CoFe20 Cu22/CoFe15/MP150/NiCr50 | 0.25 | 5.4 | 0.14 | 5.1 | 18.7 | 13.1 | 2.44 | 6° |
| 3. NiCr55/Ru5/CoFe20/Cu18/ CoFe20/MP200/NiCr20 | 0.25 | 5.0 | 5.8 | 10.5 | 21.4 | 13.6 | 2.91 | 5° |
| 4. NiCr55/Ru5/CoFe20/Cu18/ CoFe11/NiCr3.5/CoFe5/MP200/ NiCr20 | 0.25 | 7.0 | 3.3 | 11.8 | 24.0 | 10.7 | 2.55 | <1.5° |

A single spin valve structure formed on a NiCr/Ru seed layer has both a higher free layer anisotropy and Dr/r value than such a structure formed on NiCr alone or Ta.

For a 20 angstrom CoFe free layer the signal amplitudes (Dr) obtained for the Ta/, the NiCr/ and the NiCr/Ru/ structures (rows 1,2 & 3 in Table 4) are, respectively, 0.96, 2.44 and 2.91 ohms/□. An amplitude of 0.96 ohms/□ from the Ta based structure is too small for an ultra-high density application. Comparing rows 2 and 3, it is seen that $H_c$ for the NiCr/Ru/-based spin valve is less than that for the of 5.6% and a Dr of 0.96 ohms/□. The "Pin field" value within the graph refers to the average of the two positive field values at half height of Dr/r, while $H_c$ is half of the difference of these values.

Figure 1B:
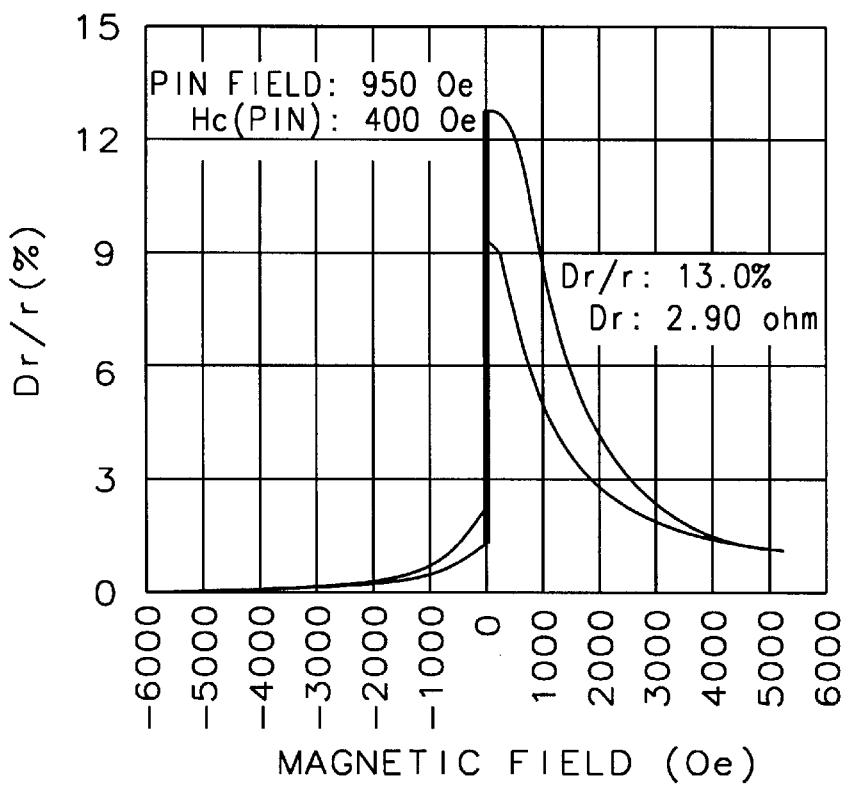
FIG. 1B is a graph similar to that of FIG. 1A, for the pinned layer structure consisting of: NiCr(55 A)/Ru(5 A)/CoFe(20 A)/Cu(18 A)/CoFe(20 A)/MP(200 A)/NiCr(50 A).

FIG. 1B is a graph similar to that of FIG. 1A, for the pinned layer structure consisting of:

NiCr(55 A)/Ru(5 A)/CoFe(20 A)/Cu(18 A)/CoFe(20 A)/MP(200 A)/NiCr(50 A), which is the configuration of row 3 of Table 4. It is noted on the graph that the pinning field is 950 Oe, the $H_c$ value is 400 Oe, Dr/r is 13.0% and Dr is 2.90 ohms/□.

Figure 1C:
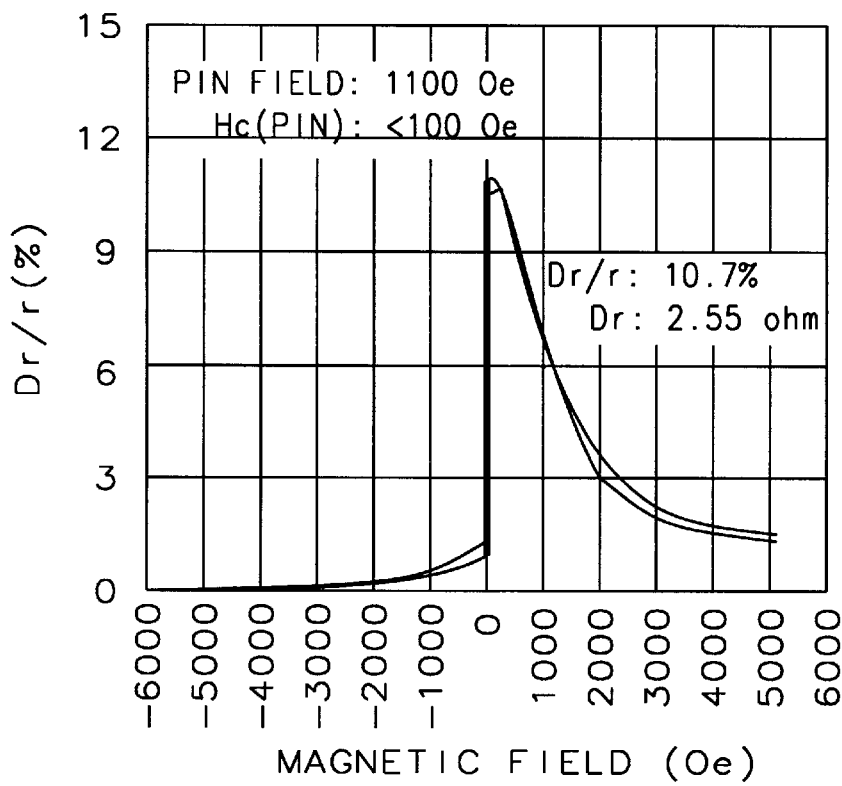
FIG. 1C is a graph similar to that of FIG. 1A, for the pinned layer structure consisting of: NiCr(55 A)/Ru(5 A)/CoFe(20 A)/Cu(18 A)/CoFe(11 A)/NiCr(3.5 A)/CoFe(5 A)/MP(200 A)/NiCr(50 A).

FIG. 1C is a graph similar to that of FIG. 1A, for the pinned layer structure consisting of:

NiCr(55 A)/Ru(5 A)/CoFe(20 A)/Cu(18 A)/CoFe(11 A)/NiCr(3.5 A)/CoFe(5 A)/MP(200 A)/NiCr(50 A), which is the laminated pinned layer configuration in row 4 of Table 4. As is noted on the graph, the pinning field is 1100 Oe, $H_c$ is less than 100 Oe, Dr/r is 10.7% and Dr is 2.55 ohms/□.

Figure 2:
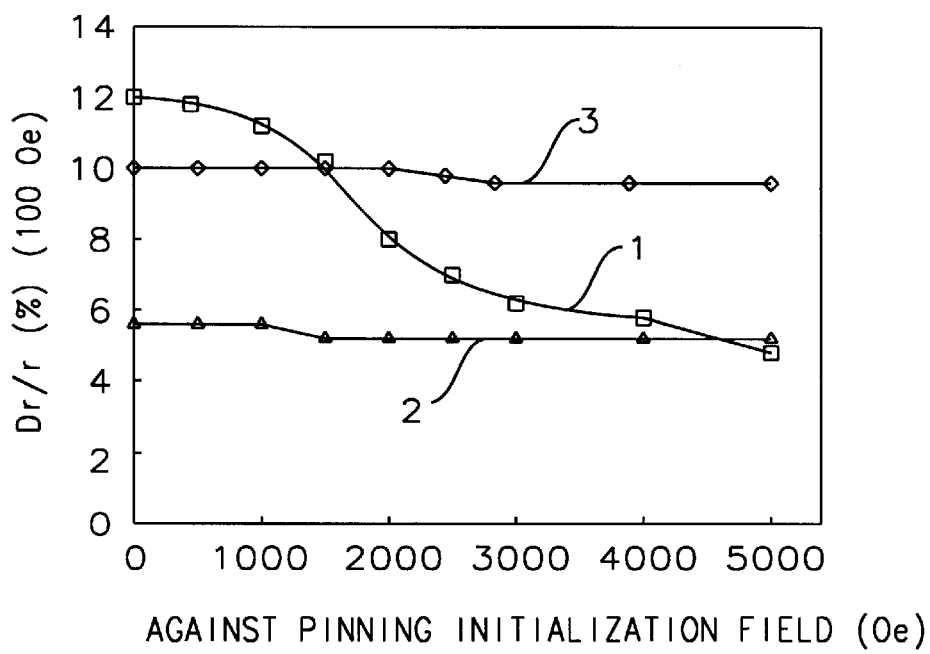
FIG. 2 is a graph of Dr/r measured in an external field of 100 Oe, vs. a range of reverse pinning initialization fields (0 Oe–5000 Oe) applied after the pinned layer has had its magnetization set, along with the pinning direction, in a field of 7000 Oe, for the three structures of FIGS. 1A–1C.

The robustness of these configurations can also be seen in FIG. 2. In this figure, in which graphs of the three configurations discussed above are superimposed, each pinned layer is first put in an assisted magnetization direction by an externally applied field of 7000 Oe. Dr/r for each configuration is then measured as a function of a new initialization field applied opposite to the 7000 Oe field. The degradation of Dr/r is then an indication of the onset of rotation of the magnetization of the pinned layer. As is shown by plotted curve 2 in the graph (corresponding to the configuration of row 1 in Table 4), the degradation of Dr/r is very gentle in a Ta-based spin valve structure. For plotted curve 1, the NiCr/Ru/-based spin valve without lamination (row 3 of Table 4), the onset of pinned layer rotation is at 1000 Oe. Thereafter, the rotation accelerates. Plotted curve 3, the NiCr/Ru/-based spin valve with lamination (row 4 of Table 4), shows good robustness. As is also indicated in Table 4, this spin valve structure has a rotation of less than 1.5° after free layer reset annealing. It is to be noted that spin valves fabricated with antiferromagnetically coupled laminated pinned layers (so-called synthetic antiferromagnetic layers) of the form CoFe/Ru/CoFe/APt, are well known to have the best pinned layer robustness (see the patent of Fontana, Jr., et al. cited above). The laminated pinned layer of the present invention is ferromagnetically coupled, yet posesses a robustness nearly that of the antiferromagnetically coupled layers along with the many additional significant advantages enumerated in the discussion of the objects of the present invention.

As a result of the device modelling summarized in the discussion above and illustrated in FIGS. 1A, 1B, 1C, and 2, it is concluded that for a NiCr/Ru-based, ultra-thin (20 A) CoFe single spin valve, the 11 A CoFe/3.5 A NiCr/5 A CoFe laminated pinned layer structure (row 4 of Table 4) yields the most optimum bias level. Said laminated pinned layer structure results in a small inter-layer coupling field ($H_e$), Magnetostatic fields produced by said laminated pinned layer structure are compensated by the sensor current field. For a read head having a gap of 0.1 microns from its lower to its upper shield, and a magnetic read track width (MRW) of 0.57 microns, the sensor sensitivity measured in terms of the ratio of peak-to-peak voltage to track width, ($V_{pp}$/MRW), of 11 mV/micron is projected. Therefore this single spin valve design, fabricated according to the methods of the present invention, is capable of decoding information magnetically stored at area densities greater than 35 Gb/in$^2$.

Figure 3:
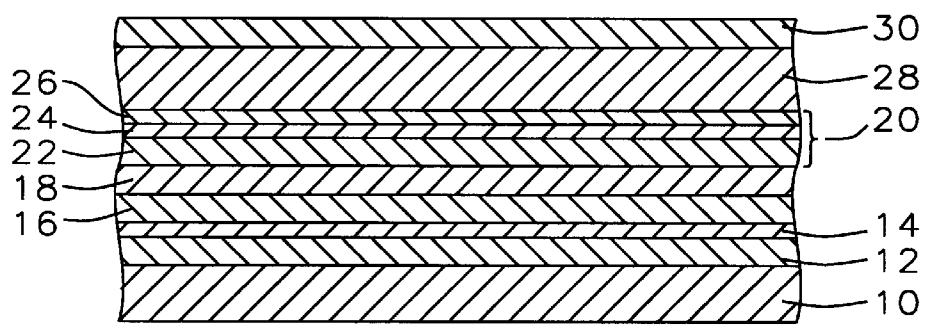
FIG. 3 is a schematic cross-sectional drawing of one possible optimal stack fabricated in accord with the methods and objects of the present invention.

Referring finally to FIG. 3, there is shown a schematic cross-sectional diagram of an optimally configured single spin valve fabricated according to the methods of the present invention. There is first provided a substrate (10), which can be formed of $Al_2O_3$, with a thickness between 0.02 and 0.04 microns. A seedlayer (12), consisting of NiCr of approximately 55 angstroms thickness, but which could be between 40 angstroms and 80 angstroms in thickness, is then formed on said substrate. Alternatively, said seedlayer could be a layer of NiFeCr formed to within the same range of thicknesses. Upon said seedlayer there is then formed a buffer layer (14) of magnetoresistive enhancing material, which in the present example is a layer of ruthenium (Ru) of approximately 5 angstroms thickness, but which could be of thickness between 3 angstroms and 25 angstroms. Alternatively, said buffer layer could be a layer of either Rh or Ir, formed to within the same range of thicknesses. There is then formed over said buffer layer a thin magnetically free layer (16) of ferromagnetic material, which in this example is a layer of CoFe of approximately 20 angstroms thickness, but which could be of thickness between 10 angstroms and 60 angstroms. Alternatively, said ferromagnetic layer could be a layer of CoFeB, formed to within the same range of thicknesses. There is then formed over said magnetically free layer a spacer layer of non-magnetic material (18), which in the present example is a layer of copper (Cu) of thickness between 16 angstroms and 30 angstroms. There is then formed on said spacer layer a ferromagnetically coupled laminated structure (20) to serve as the pinned layer. Said ferromagnetically coupled laminated structure consists of a first layer of ferromagnetic material (22), which in this example is CoFe formed to a thickness of approximately 11 angstroms, but which could be between 8 angstroms and 20 angstroms, on which is formed a layer of non-ferromagnetic material (24), which in this example is NiCr formed to a thickness of approximately 3.5 angstroms, but which could be between 2 angstroms and 5 angstroms, on which is then formed a second layer of ferromagnetic material (26), in this case a second layer of CoFe of approximately 5 angstroms thickness but which could be of thickness between 4 angstroms and 10 angstroms. Alternatively, said layers of ferromagnetic material could be layers of NiFe, Co, or CoFeB, formed to within the same thickness range, while said layer of non-ferromagnetic material could be a layer of NiFeCr, formed to within the same range of thickness. A thickness ratio between the two CoFe ferromagnetic layers of approximately 2:1, is found to provide an optimum performance characteristic for the laminated pinned layer. If the ferromagnetic layers are formed of NiFe or CoFeB, a thickness ratio of 2:1 or a slightly different thickness ratio could be necessary. A pinning layer (28) is then formed on said laminated pinned layer, consisting of a layer of MnPt of approximately 200 angstroms thickness, but which could be of thickness between 100 angstroms and 300 angstroms. Alternatively, said pinning layer could be a layer of MnPtPd, formed to within the same range of thicknesses or a layer of IrMn formed to within a range of thicknesses between 50 angstroms and 150 angstroms. Finally, the GMR stack is capped with an NiCr layer (30) for annealing purposes, said layer being formed to a thickness of approximately 30 angstroms, but which could be in the range between 20 angstroms and 50 angstroms. Alternatively, said capping layer could be a layer of either NiFeCr or Ta, formed to within the same range of thicknesses. After the GMR fabrication is complete, it is first given a high field (2000 Oe in a direction transverse to the sensor track) anneal to fix the pinned layer magnetization, followed by a low field anneal (eg. 50 Oe in the sensor track direction) to reset the free layer magnetization direction.

As is understood by a person skilled in the art, the preferred embodiment of the present invention is illustrative of the present invention rather than being limiting of the present invention. Revisions and modifications may be made to methods, processes, materials, structures, and dimensions through which is formed a single top spin valve head for ultra-high recording densities, while still providing a single top spin valve head for ultra-high recording densities, formed in accord with the present invention as defined by the appended claims.

What is claimed is:

1. A method for fabricating a single top spin valve read head for ultra-high recording densities comprising:

providing a seed layer formed over an $Al_2O_3$ substrate;

forming over said seed layer a buffer layer which provides an enhancement of specular reflection of conduction electrons;

forming over said buffer layer a layer of ferromagnetic material which will function as a magnetically free layer;

forming over said ferromagnetic layer a spacer layer of non-magnetic material;

forming over said spacer layer a laminated pinned layer;

forming over said laminated pinned layer a pinning layer;

forming over said pinning layer a capping layer;

annealing said fabrication a first time to fix the magnetization of the pinned layer;

annealing said fabrication a second time to reset the magnetization of the magnetically free layer.

2. The method of claim 1 wherein the seed layer is a layer of either NiCr or NiFeCr and is formed to a thickness of between 40 angstroms and 70 angstroms.

3. The method of claim 1 wherein said buffer layer is a layer of material selected from the group consisting of Ru, Rh and Ir and is formed to a thickness of between 3 angstroms and 25 angstroms.

4. The method of claim 1 wherein the non-magnetic spacer layer is a layer of Cu and is formed to a thickness of between 18 angstroms and 30 angstroms.

5. The method of claim 1 wherein the laminated pinned layer consists of a first ferromagnetic layer, on which is formed a non magnetic spacer layer, on which is formed a second ferromagnetic layer, the resulting structure being ferromagnetically coupled.

6. The method of claim 5 wherein said first ferromagnetic layer is a layer of CoFe formed to a thickness of between 8 angstroms and 20 angstroms, the non-magnetic spacer layer is a layer of NiCr formed to a thickness between 2 angstroms and 5 angstroms and the second ferromagnetic layer is a layer of CoFe formed to a thickness of between 4 angstroms and 10 angstroms.

7. The method of claim 6 wherein the thicknesses of the first and second ferromagnetic layers are in a ratio of 2:1.

8. The method of claim 5 wherein said first ferromagnetic layer is selected from the group consisting of Co, CoFe, CoFeB and NiFe and is formed to a thickness of between 8 angstroms and 20 angstroms, the non-magnetic spacer layer is selected from the group consisting of NiCr and NiFeCr and is formed to a thickness of between 2 angstroms and 5 angstroms and the second ferromagnetic layer is selected from the group consisting of Co, CoFe, CoFeB and NiFe and is formed to a thickness of between 4 angstroms and 10 angstroms.

9. The method of claim 8 wherein the thicknesses of the two ferromagnetic layers are in a ratio of 2:1 or approximately 2:1.

10. The method of claim 1 wherein the pinning layer is a layer of MnPt or MnPtPd and is formed to a thickness of between 100 angstroms and 300 angstroms.

11. The method of claim 1 wherein the pinning layer is a layer of IrMn and is formed to a thickness of between 50 angstroms and 150 angstroms.

12. The method of claim 1 wherein the capping layer is a layer of material selected from the group consisting of NiCr, NiFeCr and Ta and is formed to a thickness of between 20 angstroms and 50 angstroms.

13. The method of claim 1 wherein the first anneal is at 280° C. for 5 hours in a transverse magnetic field of 2000 Oe.

14. The method of claim 1 wherein the second anneal is at 290° C. for 30 minutes in a magnetic field of 50 Oe in the longitudinal direction.

15. The structure of claim 1 wherein the first anneal is at 280° C. for 5 hours in a transverse magnetic field of 2000 Oe.

16. The structure of claim 1 wherein the second anneal is at 290° C. for 30 minutes in a magnetic field of 50 Oe in the longitudinal direction.

17. A single top spin valve read head for ultra-high recording densities comprising:

a seed layer formed on an $Al_2O_3$ substrate;

a buffer layer, which provides an enhancement of specular reflection of conduction electrons, formed on said seed layer;

a layer of ferromagnetic material which functions as a magnetically free layer formed over said buffer layer and having its magnetization set by a second anneal;

a spacer layer of non-magnetic material formed over said ferromagnetic layer;

a laminated pinned layer formed over said spacer layer and having its magnetization fixed by a first anneal;

a pinning layer formed over said laminated pinned layer;

a capping layer formed over said pinning layer.

18. The structure of claim 17 wherein the seed layer is a layer of either NiCr or NiFeCr and is formed to a thickness of between 40 angstroms and 70 angstroms.

19. The structure of claim 17 wherein the material of said buffer layer is a layer of material selected from the group consisting of Ru, Rh and Ir and is formed to a thickness of between 3 angstroms and 25 angstroms.

20. The structure of claim 17 wherein the non-magnetic spacer layer is a layer of Cu and is formed to a thickness of between 18 angstroms and 30 angstroms.

21. The structure of claim 17 wherein the laminated pinned layer consists of a first ferromagnetic layer, on which is formed a non magnetic spacer layer, on which is formed a second ferromagnetic layer, the resulting structure being ferromagnetically coupled.

22. The structure of claim 21 wherein said first ferromagnetic layer is a layer of CoFe deposited to a thickness of between 8 angstroms and 20 angstroms, the non-magnetic spacer layer is a layer of NiCr formed to a thickness between 2 angstroms and 5 angstroms and the second ferromagnetic layer is a layer of CoFe formed to a thickness of between 4 angstroms and 10 angstroms.

23. The structure of claim 22 wherein the thicknesses of the first and second ferromagnetic layers are in a ratio of 2:1.

24. The structure of claim 21 wherein said first ferromagnetic layer is selected from the group consisting of Co, CoFe, CoFeB and NiFe and is formed to a thickness of between 8 angstroms and 20 angstroms, the non-magnetic spacer layer is selected from the group consisting of NiCr and NiFeCr and is formed to a thickness of between 2 angstroms and 5 angstroms and the second ferromagnetic layer is selected from the group consisting of Co, CoFe, CoFeB and NiFe and is formed to a thickness of between 4 angstroms and 10 angstroms.

25. The structure of claim 24 wherein the thicknesses of the two ferromagnetic layers are in a ratio of 2:1 or approximately 2:1.

26. The structure of claim 17 wherein the pinning layer is a layer of MnPt or MnPtPd and is formed to a thickness of between 100 angstroms and 300 angstroms.

27. The structure of claim 17 wherein the pinning layer is a layer of IrMn and is formed to a thickness of between 50 angstroms and 150 angstroms.

28. The structure of claim 17 wherein the capping layer is a layer of material selected from the group consisting of NiCr, NiFeCr and Ta and is formed to a thickness of between 20 angstroms and 50 angstroms.

* * * * *